(12) United States Patent
Makino et al.

(10) Patent No.: US 10,515,762 B2
(45) Date of Patent: Dec. 24, 2019

(54) ELECTRONIC COMPONENT INCLUDING A RESISTIVE LAYER

(71) Applicant: Murata Manufacturing Co., Ltd., Nagaokakyo-shi, Kyoto-fu (JP)

(72) Inventors: Toshikazu Makino, Nagaokakyo (JP); Hidehiko Tanaka, Nagaokakyo (JP); Makoto Matsuda, Nagaokakyo (JP); Togo Matsui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/455,268

(22) Filed: Mar. 10, 2017

(65) Prior Publication Data

US 2017/0271083 A1     Sep. 21, 2017

(30) Foreign Application Priority Data

Mar. 17, 2016  (JP) ................................ 2016-054373

(51) Int. Cl.
*H01G 4/232* (2006.01)
*H01G 4/30* (2006.01)
(Continued)

(52) U.S. Cl.
CPC ............... *H01G 4/30* (2013.01); *H01G 4/008* (2013.01); *H01G 4/12* (2013.01); *H01G 4/232* (2013.01); *H01G 4/248* (2013.01)

(58) Field of Classification Search
CPC ........ H01G 4/232; H01G 4/248; H01G 4/008; H01G 4/12; H01G 4/30
See application file for complete search history.

(56) References Cited

U.S. PATENT DOCUMENTS

| 7,054,136 B2* | 5/2006 | Ritter ............. H01G 4/2325 361/309 |
| 7,589,954 B2* | 9/2009 | Kusano ............ H01G 4/232 252/62.2 |

(Continued)

FOREIGN PATENT DOCUMENTS

| EP | 1 783 790 A1 | 5/2007 |
| JP | 04-328814 A | 11/1992 |

(Continued)

OTHER PUBLICATIONS

Official Communication issued in corresponding Japanese Patent Application No. 2016-054373, dated Jul. 10, 2018.

(Continued)

*Primary Examiner* — David M Sinclair
(74) *Attorney, Agent, or Firm* — Keating & Bennett, LLP

(57) ABSTRACT

An electronic component includes a laminate including dielectric layers and internal electrode layers stacked in a lamination direction. A first external electrode is on a first end surface of the laminate, and connected with a first of the internal electrode layers. A second external electrode is on a second end surface of the laminate, and connected with a second of the internal electrode layers. The first external electrode includes a first metallic layer connected to the first internal electrode layer, and a second metallic layer disposed on the first metallic layer. The first metallic layer has a higher specific resistance than the second metallic layer, and a difference between a thickness of an outermost portion of the first metallic layer in the lamination direction and a thickness of a center portion of the first metallic layer in a center in the lamination direction is about 5 μm or less.

11 Claims, 9 Drawing Sheets

LT SECTION VIEW

(51) Int. Cl.
  *H01G 4/008* (2006.01)
  *H01G 4/12* (2006.01)
  *H01G 4/248* (2006.01)

(56) References Cited

U.S. PATENT DOCUMENTS

| | | | |
|---|---|---|---|
| 8,837,112 B2* | 9/2014 | Gu | H01G 4/12 |
| | | | 361/301.2 |
| 9,111,682 B2* | 8/2015 | Sawada | H01G 4/30 |
| 2004/0042155 A1 | 3/2004 | Ritter et al. | |
| 2007/0128794 A1* | 6/2007 | Kusano | H01G 4/2325 |
| | | | 438/253 |
| 2007/0205514 A1 | 9/2007 | Togashi | |
| 2008/0128860 A1* | 6/2008 | Sawada | H01G 4/232 |
| | | | 257/536 |
| 2008/0310077 A1* | 12/2008 | Itamura | H01G 4/228 |
| | | | 361/306.3 |
| 2009/0284898 A1* | 11/2009 | Kusano | C04B 35/457 |
| | | | 361/305 |
| 2013/0020905 A1 | 1/2013 | Sawada et al. | |
| 2013/0182368 A1* | 7/2013 | Jeon | H01G 4/30 |
| | | | 361/301.4 |
| 2013/0182369 A1* | 7/2013 | Jeon | H01G 4/30 |
| | | | 361/301.4 |
| 2013/0215552 A1 | 8/2013 | Saito | |
| 2017/0098506 A1* | 4/2017 | Ando | H01G 4/005 |

FOREIGN PATENT DOCUMENTS

| | | |
|---|---|---|
| JP | 2004-047983 A | 2/2004 |
| JP | 2007-234903 A | 9/2007 |
| JP | 2008-159965 A | 7/2008 |
| JP | 2009-049320 A | 3/2009 |
| JP | 2011-166030 A | 8/2011 |
| JP | 2012-151397 A | 8/2012 |
| JP | 2013-168526 A | 8/2013 |
| JP | 2014-096541 A | 5/2014 |
| WO | 2006/022258 A1 | 3/2006 |

OTHER PUBLICATIONS

Official Communication issued in Korean Patent Application No. 10-2017-0028170, dated Aug. 16, 2018.

* cited by examiner

LT SECTION VIEW

LT SECTION VIEW

ELECTRONIC COMPONENT INCLUDING A RESISTIVE LAYER

CROSS REFERENCE TO RELATED APPLICATIONS

This application claims the benefit of priority to Japanese Patent Application No. 2016-054373 filed on Mar. 17, 2016. The entire contents of this application are hereby incorporated herein by reference.

BACKGROUND OF THE INVENTION

1. Field of the Invention

The present invention relates to an electronic component and a method for manufacturing an electronic component.

2. Description of the Related Art

In a multilayer ceramic capacitor, external electrodes are formed on surfaces of a laminate that is obtained by laminating a dielectric layer and an internal electrode layer alternately and conducting a firing treatment. By employing such a structure, it is possible to obtain a capacitor having a small size and a large capacitance. Therefore, multilayer ceramic capacitors are widely used in various applications in association with the recent increased demands for mobile devices and the like.

A laminate includes a plurality of internal electrode layers, and the plurality of internal electrode layers are exposed on surfaces of the laminate and connected with external electrodes.

JP 2008-159965 A discloses an electronic component in which an underlying electrode layer to be connected with internal electrode layers is formed, and on the underlying electrode layer, a glass layer and an external electrode layer are formed.

In JP 2008-159965 A, the glass layer functions as a resistive layer. JP2008-159965 A also indicates that the glass layer is formed by applying a glass paste on an end surface of a laminate.

When a resistive layer is formed by application of a glass paste, the thickness of the applied glass paste varies due to the variation in the viscosity of the glass paste or the variation in the degree of advance of drying of the glass paste. Thus, the thickness of the glass layer that is to define a resistive layer varies, and the resistance itself of the resistive layer can vary.

In recent years, multilayer ceramic capacitors are used in applications as typified by mobile products for which power saving is advanced. When a multilayer ceramic capacitor is used in such an application, even a small change in the voltage results in a large change in the current if the variation in the resistance of the resistive layer is large, and hence the multilayer ceramic capacitor is unacceptable.

SUMMARY OF THE INVENTION

Preferred embodiments of the present invention provide an electronic component with little variation in the resistance of the resistive layer and a method for manufacturing the same.

An electronic component according to a preferred embodiment of the present invention includes a laminate including a plurality of dielectric layers and a plurality of internal electrode layers disposed in a lamination direction, the laminate including a first principal surface and a second principal surface opposite to each other in the lamination direction, a first lateral surface and a second lateral surface opposite to each other in a width direction perpendicular or substantially perpendicular to the lamination direction, and a first end surface and a second end surface opposite to each other in a length direction perpendicular or substantially perpendicular to the lamination direction and the width direction; a first external electrode disposed on the first end surface of the laminate, and connected with the internal electrode layer; and a second external electrode disposed on the second end surface of the laminate, and connected with the internal electrode layer, and the first external electrode includes a first metallic layer connected with the internal electrode layer, and a second metallic layer disposed on the first metallic layer, the first metallic layer has a higher specific resistance than the second metallic layer, and a difference between a thickness of an outermost portion of the first metallic layer which is a thickness of the first metallic layer on an outermost internal electrode layer disposed on the outermost side in the lamination direction among the internal electrode layers, and a thickness of a center portion of the first metallic layer which is a thickness of the first metallic layer in a center in the lamination direction is about 5 μm or less.

In an electronic component according to a preferred embodiment of the present invention, the first metallic layer preferably contains at least one compound selected from the group consisting of metal, a metal oxide, and glass.

The metal is preferably at least one metal selected from the group consisting of Ag, Ni, Cu, Au and Pd.

The metal oxide preferably includes at least one compound selected from the group consisting of indium tin oxide, alumina and zirconia.

The metal defining the second metallic layer is preferably Cu.

A method for manufacturing an electronic component according to a preferred embodiment of the present invention includes preparing a laminate including a plurality of dielectric layers and a plurality of internal electrode layers disposed in a lamination direction, the laminate including a first principal surface and a second principal surface opposite to each other in the lamination direction, a first lateral surface and a second lateral surface opposite to each other in a width direction perpendicular or substantially perpendicular to the lamination direction, and a first end surface and a second end surface opposite to each other in a length direction perpendicular or substantially perpendicular to the lamination direction and the width direction; adding a conductive sheet that is to define a first metallic layer to the first end surface of the laminate; and dipping the first end surface on which the conductive sheet is added in a conductive paste that is to define a second metallic layer.

In a method for manufacturing an electronic component according to a preferred embodiment of the present invention, the conductive sheet is preferably added by applying a pressure while the first end surface of the laminate and the conductive sheet are brought into contact with each other.

Preferably, the conductive sheet contains a resin, and the conductive sheet is added by heating the conductive sheet to a temperature higher than or equal to a phase transition point of the resin and bringing the first end surface of the laminate and the conductive sheet into contact with each other.

Preferably, the conductive sheet is carried by an elastic body, and the conductive sheet is added by punching out the conductive sheet with the first end surface of the laminate.

An electronic component according to a preferred embodiment of the present invention includes the first metallic layer connected with the internal electrode layer. The first metallic layer has a higher specific resistance than the second metallic layer, and is able to define and function as a resistive layer. Since the first metallic layer has little variation in thickness, it is possible to achieve an electronic component with little variation in the resistance.

In a method for manufacturing an electronic component according to a preferred embodiment of the present invention, since the first metallic layer is formed by using a conductive sheet, it is possible to form a first metallic layer with little variation in thickness, and it is possible to manufacture an electronic component with little variation in the resistance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electronic components of the present invention, and methods for manufacturing an electronic component according to preferred embodiments of the present invention will be described with reference to attached drawings. However, the present invention is not limited to the following configurations of preferred embodiments, but can be modified and applied as appropriate without changing the gist of the present invention. The present invention includes any combination of two or more of individual desirable configurations or preferred embodiments according to the present invention to be described later.

Hereinafter, one example of an electronic component of a preferred embodiment of the present invention including a laminate and an external electrode will be described while taking a multilayer ceramic capacitor as an example.

Figure 1:
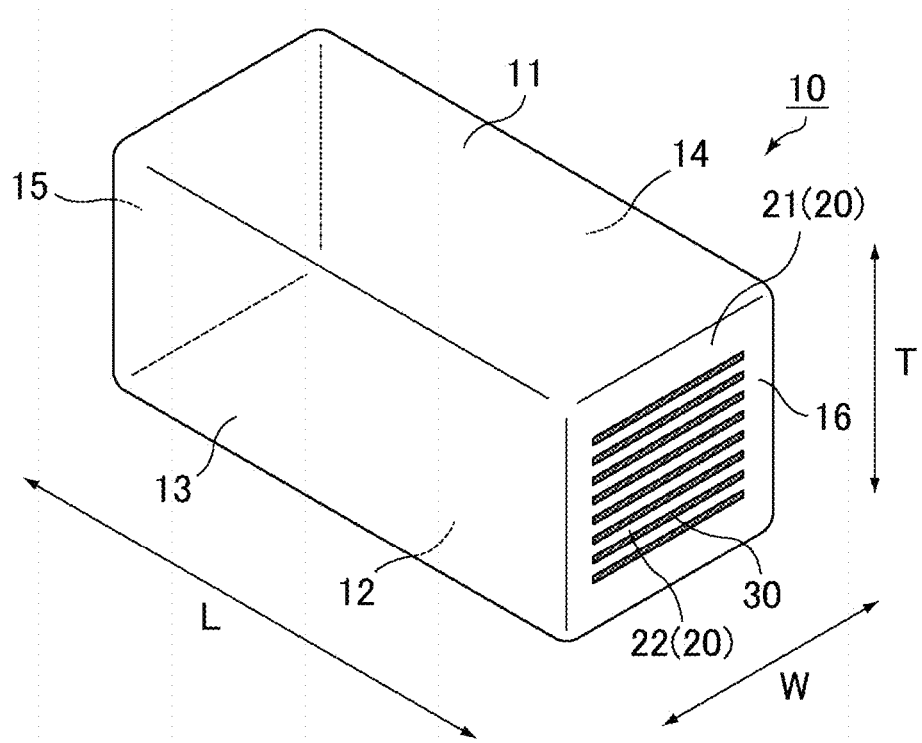
FIG. 1 is a perspective view schematically showing one example of a laminate defining a multilayer ceramic capacitor which is an electronic component according to a preferred embodiment of the present invention.
Figure 2:
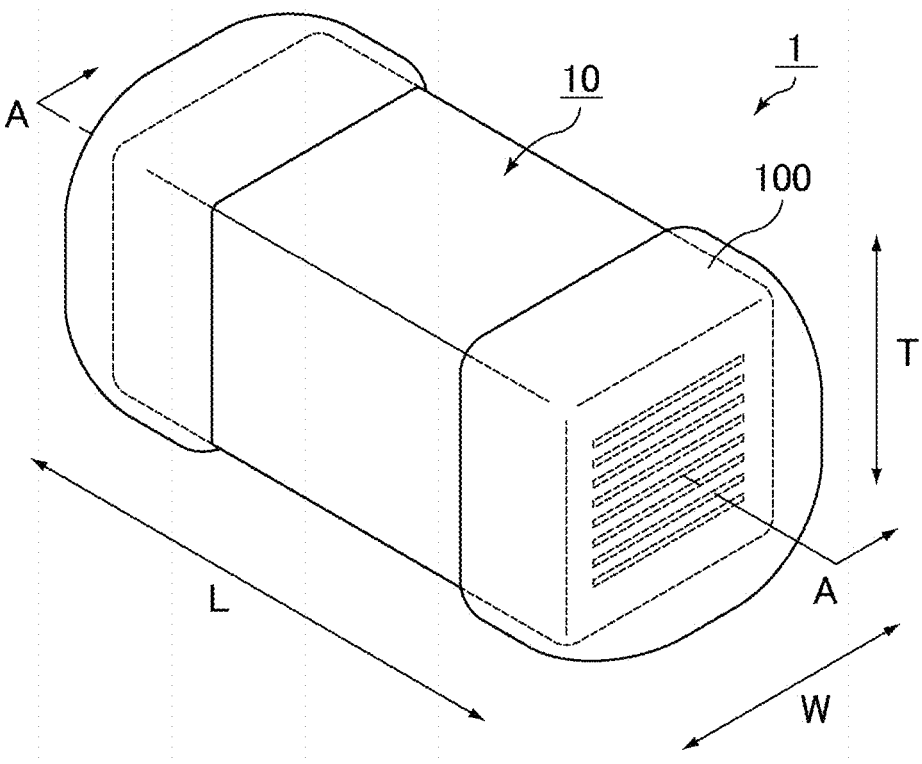
FIG. 2 is a perspective view schematically showing one example of a multilayer ceramic capacitor which is an electronic component according to a preferred embodiment of the present invention.

FIG. 1 is a perspective view schematically showing one example of a laminate defining a multilayer ceramic capacitor which is an electronic component according to a preferred embodiment of the present invention, and FIG. 2 is a perspective view schematically showing one example of a multilayer ceramic capacitor which is an electronic component according to a preferred embodiment of the present invention. A multilayer ceramic capacitor 1 shown in FIG. 2 is formed by providing an end surface of a laminate 10 shown in FIG. 1 with an external electrode 100.

In a multilayer ceramic capacitor and a laminate according to preferred embodiments of the present invention, the length direction, the width direction and the lamination direction are directions defined by double-headed arrows L, W, and T, respectively in the laminate 10 shown in FIG. 1 and the multilayer ceramic capacitor 1 shown in FIG. 2. Here, the length direction, the width direction, and the lamination direction are perpendicular or substantially perpendicular one another. The lamination direction is the direction in which a plurality of dielectric layers 20 and a plurality of internal electrode layers 30 that define the laminate 10 are stacked.

The laminate 10 preferably has a rectangular or substantially rectangular parallelepiped shape including six surfaces, and includes the plurality of dielectric layers 20 and the plurality of internal electrode layers 30 that are laminated. The laminate 10 includes a first principal surface 11 and a second principal surface 12 opposite to each other in the lamination direction T indicated by the double-headed arrow T in FIG. 1, a first lateral surface 13 and a second lateral surface 14 opposite to each other in the width direction W indicated by the double-headed arrow W that is perpendicular or substantially perpendicular to the lamination direction T, and a first end surface 15 and a second end surface 16 opposite to each other in the length direction L indicated by the double-headed arrow L that is perpendicular or substantially perpendicular to the lamination direction T and the width direction W.

In the present description, the section of the laminate 10 that intersects with the first end surface 15 or the second end surface 16, and extends along the lamination direction of the laminate 10 is referred to as an LT section. The section of the laminate 10 that intersects with the first lateral surface 13 or the second lateral surface 14, and extends along the lamination direction of the laminate 10 is referred to as a WT section.

The section of the laminate 10 that intersects with the first lateral surface 13, the second lateral surface 14, the first end surface 15 or the second end surface 16, and is perpendicular or substantially perpendicular to the lamination direction of the laminate 10 is referred to as an LW section.

In the laminate 10, preferably ridge portions and corner portions are rounded. A corner portion is the portion where three surfaces of the laminate intersect with each other, and a ridge portion is the portion where two surfaces of the laminate intersect with each other.

The length in the L direction of the laminate 10 is preferably about 0.4 mm or more and about 1.0 mm or less, for example.

The length in the W direction of the laminate 10 is preferably about 0.2 mm or more and about 0.5 mm or less, for example.

The length in the T direction of the laminate 10 is preferably about 0.2 mm or more and about 0.5 mm or less, for example.

The dielectric layer 20 includes an outer layer portion 21 and an inner layer portion 22. The outer layer portion 21 is a dielectric layer that is situated on the sides of both principal surfaces of the laminate 10, and is situated between a principal surface and the internal electrode layer nearest to the principal surface. The region situated between both outer layer portions 21 is the inner layer portion 22.

The number of layers of the dielectric layer is preferably about 200 or more and about 600 or less, for example. The number of layers of the dielectric layer does not include the number of the dielectric layers that define the outer layer portion.

Among the dielectric layers, the thickness of each dielectric layer defining the inner layer portion is preferably about 0.4 μm or more and about 0.8 μm or less, for example. The thickness of the outer layer portion is preferably about 20 μm or more and about 30 μm or less, for example.

Each dimension of the laminate as described above can be measured by a micrometer, and the number of dielectric layers can be counted by using an optical microscope.

As each dielectric layer, perovskite compounds represented by the general formula $AmBO_3$ (A site is Ba, and may contain at least one selected from the group consisting of Sr and Ca besides Ba. B site is Ti, and may contain at least one selected from the group consisting of Zr and Hf besides Ti. O represents oxygen. m represents a molar ratio between A site and B site.) typified by barium titanate ($BaTiO_3$) are preferably used. Also ceramic materials containing calcium titanate ($CaTiO_3$), strontium titanate ($SrTiO_3$), calcium zirconate ($CaZrO_3$) or the like as a main component may be used. Each dielectric layer may contain Mn, Mg, Si, Co, Ni, rare-earth elements or the like as an accessory component which is contained in a smaller amount than the main component.

The internal electrode layer preferably contains a metallic material such as Ni, Cu, Ag, Pd, Ag—Pd alloy, or Au. It is also preferred that the internal electrode contains a dielectric material having the same composition series as that of the ceramic material contained in the dielectric layer.

The number of layers of the internal electrode layer is preferably two or more, and preferably about 500 or less, for example. The thickness of the internal electrode layer is preferably about 0.3 μm or more and about 1.0 μm or less, for example.

Figure 3:
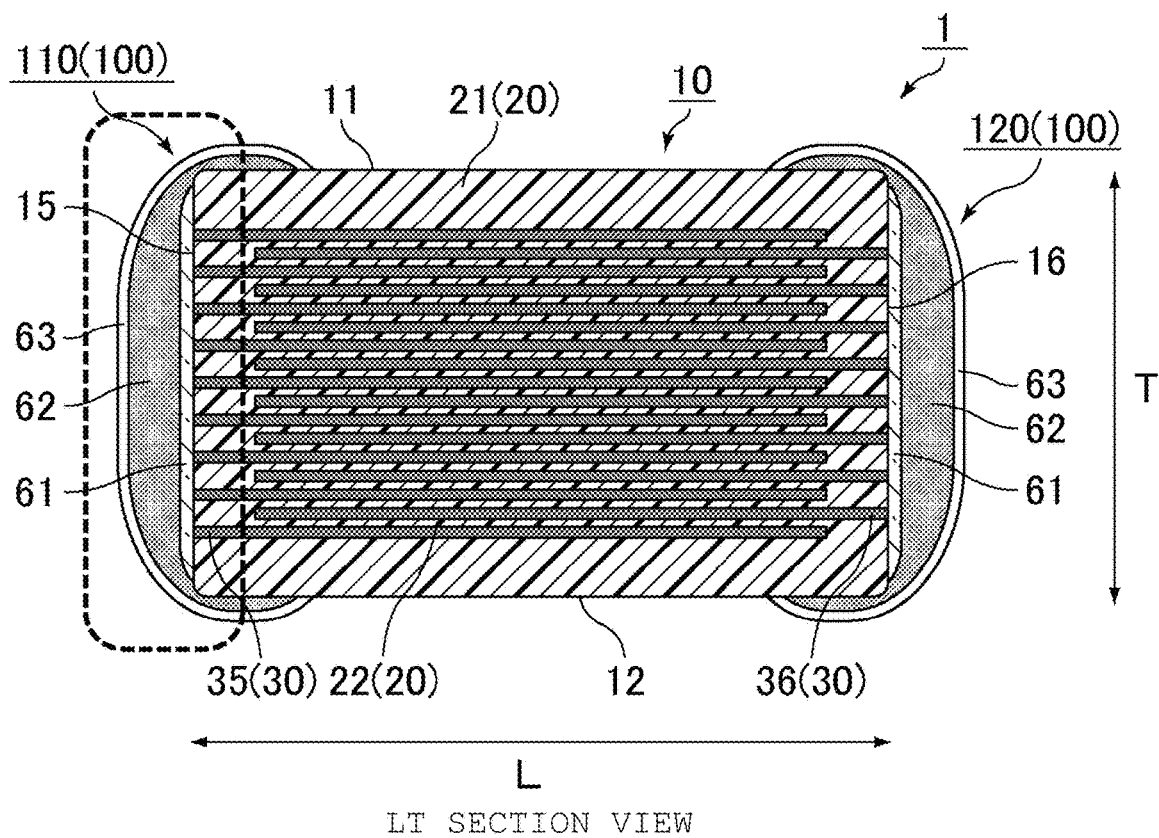
FIG. 3 is a sectional view schematically showing one example of an LT section of a multilayer ceramic capacitor which is an electronic component according to a preferred embodiment of the present invention.

FIG. 3 is a sectional view schematically showing one example of an LT section of a multilayer ceramic capacitor which is an electronic component according to a preferred embodiment of the present invention. FIG. 3 is also a section view along the line A-A in FIG. 2. As shown in FIG. 3, the plurality of internal electrode layers 30 include a first internal electrode layer 35 and a second internal electrode layer 36 arranged in the lamination direction. The first internal electrode layer 35 is exposed on the first end surface 15, and the second internal electrode layer 36 is exposed on the second end surface 16. Electrostatic capacitance arises in an opposite electrode portion where the first internal electrode layer 35 and the second internal electrode layer 36 are opposed to each other with the dielectric layer 20 interposed therebetween.

Each internal electrode layer 30 preferably has a rectangular or substantially rectangular shape in planar view from the lamination direction.

The first internal electrode layer 35 that is opposed to the second internal electrode layer 36 with the dielectric layer 20 interposed therebetween includes an opposite electrode portion that is opposed to the second internal electrode layer 36 with the dielectric layer 20 interposed therebetween, and an extended electrode portion that is extended from the opposite electrode portion to the first end surface 15, and is exposed on the first end surface 15. The second internal electrode layer 36 that is opposed to the first internal electrode layer 35 with the dielectric layer 20 interposed therebetween has an opposite electrode portion that is opposed to the opposite electrode portion of the first internal electrode layer 35 with the dielectric layer 20 interposed therebetween, and an extended electrode portion that is extended from the opposite electrode portion to the second end surface 16, and is exposed on the second end surface 16.

The portion of the laminate including the extended electrode portion situated between the opposite electrode portion, and the first end surface or the second end surface is also referred to as an L gap.

The portion of the laminate situated between the opposite electrode portion, and the first lateral surface or the second lateral surface is also referred to as a W gap.

The external electrode 100 preferably includes a first external electrode 110 and a second external electrode 120. The first external electrode 110 is provided on the first end surface 15 of the laminate 10, and extends from the first end surface 15 to respective portions of the first principal surface 11, the second principal surface 12, the first lateral surface 13 and the second lateral surface 14. The first external electrode 110 is connected with each of the first internal electrode layers 35 on the first end surface 15.

The second external electrode 120 is preferably provided on the second end surface 16 of the laminate 10, and extends from the second end surface 16 to respective portions of the first principal surface 11, the second principal surface 12, the first lateral surface 13 and the second lateral surface 14. The second external electrode 120 is connected with each of the second internal electrode layers 36 on the second end surface 16.

The details of the configuration of the external electrode will be described for the first external electrode 110. The first external electrode 110 preferably includes a first metallic layer 61 connected with the first internal electrode layer 35, a second metallic layer 62 disposed on first metallic layer 61, and a plating layer 63 disposed on the second metallic layer 62.

The second external electrode 120 is preferably configured in the same manner as the first external electrode 110.

In an electronic component according to a preferred embodiment of the present invention, the first metallic layer may be provided only in the first external electrode disposed on the first end surface.

The first metallic layer is a layer having a higher specific resistance than the second metallic layer, and defines and functions as a resistive layer. Preferably, the specific resistance of the first metallic layer is about 1 mΩ or more and about 1Ω or less, for example.

The specific resistances of the first metallic layer and the second metallic layer can be measured, for example, by a 3584A meter available from HP.

Specifically, a sheet that is to define the first metallic layer or the second metallic layer is prepared, and the sheet is placed so that it crosses two lands. By putting a probe of the 3584A meter available from HP on the two lands, a resistance is measured. Further, a sectional area of the sheet is measured by a contact-type surface roughness meter, or a laser displacement meter.

Then by dividing the resistance by the sectional area, a specific resistance is calculated.

Preferably, the first metallic layer is a layer containing at least one compound selected from the group consisting of metal, a metal oxide and glass.

Preferably, the metal includes at least one metal selected from the group consisting of Ag, Ni, Cu, Au and Pd. It is more preferred that Ni is contained among these. This is because the grain size of Ni is able to be made fine.

Preferably, the metal oxide contains a conductive powder, and the conductive powder preferably contains at least one compound selected from the group consisting of indium tin oxide, alumina and zirconia. It is more preferred that the conductive powder contains indium tin oxide.

As the glass, $BaO$—$SrO$—$B_2O_3$—$SiO_2$ glass, $Bi_2O_3$—$B_2O_3$—$SiO_2$—$ZnO$—$Al_2O_3$ glass, $ZnO$—$B_2O_3$—$SiO_2$—$Al_2O_3$ glass and the like can preferably be used, for example.

Regarding the thickness of the first metallic layer, a difference in thickness between the outermost portion and the center portion preferably is about 5 μm or less, and thus the first metallic layer is a metallic layer with little variation in thickness. This will be specifically described by the use of drawings.

Figure 4:
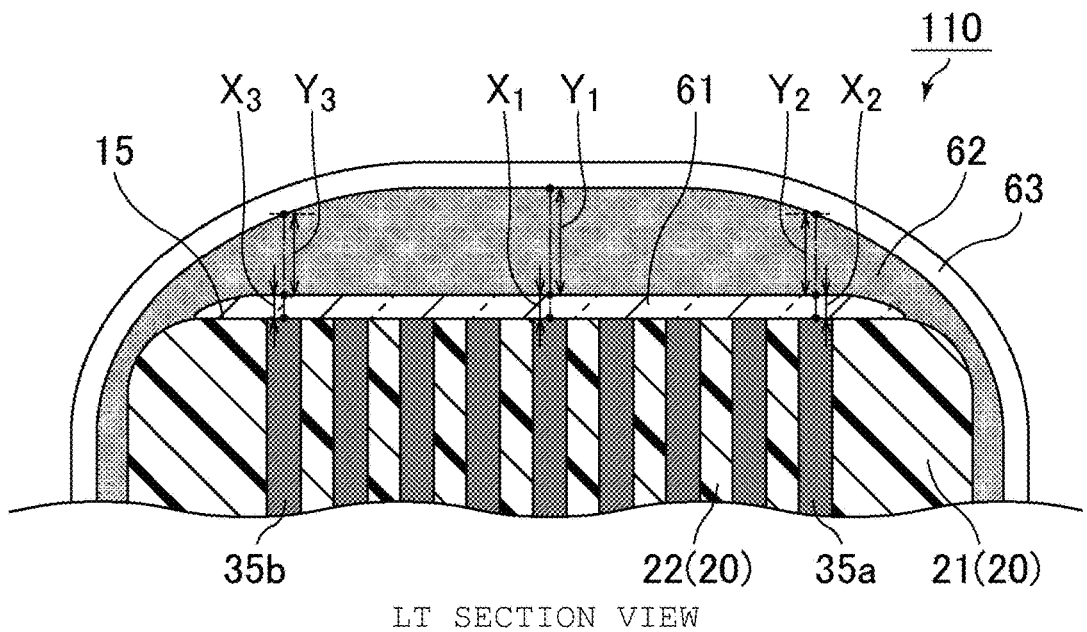
FIG. 4 is an enlarged sectional view of the area near an external electrode surrounded by the broken line in FIG. 3.

FIG. 4 is an enlarged section view of the area near an external electrode surrounded by the broken line in FIG. 3.

Among the first internal electrode layers 35, the internal electrode layers that are disposed at the outermost positions in the lamination direction are referred to as an outermost internal electrode layer 35a and an outermost internal electrode layer 35b.

The thickness of the first metallic layer 61 on the outermost internal electrode layer 35a is a thickness indicated by the double-headed arrow $X_2$ in FIG. 4, and the thickness of the first metallic layer 61 on the outermost internal electrode layer 35b is a thickness indicated by the double-headed arrow $X_3$ in FIG. 4. Each of the thicknesses indicated by the double-headed arrow $X_2$ and the double-headed arrow $X_3$ are is a thickness of the outermost portion of the first metallic layer.

The thickness of the first metallic layer 61 in the center in the lamination direction is a thickness indicated by the double-headed arrow $X_1$ in FIG. 4. The thickness indicated by the double-headed arrow $X_1$ is the thickness of the center portion of the first metallic layer. The center in the lamination direction can be defined as the middle point of the two outermost internal electrode layers.

In this description, the expression "a difference in thickness between the thickness of the outermost portion of the first metallic layer and the thickness of the center portion of the first metallic layer preferably is about 5 μm or less" means that a difference between the mean value of the thicknesses of the two outermost portions of the first metallic layer, and the thickness of the center portion of the first metallic layer is about 5 μm or less, for example.

Preferably, a difference between the thickness of the outermost portion of the first metallic layer and the thickness of the center portion of the first metallic layer is about 2 μm or less, for example.

For convenience, while a difference between the thickness of the center portion of the first metallic layer and the thickness of the outermost portion of the first metallic layer is determined, a difference between the maximum value and the minimum value of the thickness of the first electrode layer may be determined over the entire positions from a position on one of the outermost internal electrode layers to a position on the other of the outermost internal electrode layers.

Regarding the thickness of the first metallic layer, it is more preferred that a difference between the maximum value and the minimum value of the thickness of the first electrode layer is about 5 μm or less over the entire positions from a position on one of the outermost internal electrode layers to a position on the other of the outermost internal electrode layers, for example. The both ends of the first electrode layer are situated at a further outer position than the outermost internal electrode layer, and the thickness of that portion tends to be small. The above definition means that the first electrode layer does not include an especially thick or thin part over the entire positions where the first electrode layer connects with the internal electrode layer except the part positioned on the outer side than the outermost internal electrode layer.

The thickness of the first metallic layer can be obtained by polishing the laminate to a depth of about ½ in the width direction so that the LT section is exposed, and obtaining an electronic image of the laminate section, and measuring the thickness of the first metallic layer.

Preferably, the thickness of the first metallic layer is about 3 μm or more and about 30 μm or less, for example. It is more preferably about 3 μm or more and about 20 μm or less, for example. When the thickness of the first metallic layer is about 5 μm or more and about 20 μm or less, for example, a difference between the thickness of the outermost portion of the first metallic layer and the thickness of the center portion of the first metallic layer is preferably about 2 μm or less, for example.

Further preferably, the thickness of the first metallic layer is about 3 μm or more and about 5 μm or less, for example. When the thickness of the first metallic layer is about 3 μm or more and about 5 μm or less, a difference between the thickness of the outermost portion of the first metallic layer and the thickness of the center portion of the first metallic layer is preferably about 1 μm or less, for example.

The aforementioned thickness of the first metallic layer is defined as a mean value of the thickness of the center portion of the first metallic layer and the thickness of the two outermost portions of the first metallic layer.

Preferably, the second metallic layer is a layer containing glass and metal. It is preferably a baked layer that is obtained by applying a conductive paste containing glass and metal on a laminate, and baking the conductive paste. The baked layer may include a single layer or a plurality of layers.

Preferably, the thickness of the thickest portion of the baked layer is about 1 μm or more and about 50 μm or less, for example. When the baked layer includes a plurality of layers, the thickness of the baked layer is defined as a total thickness of the plurality of layers.

Preferably, a difference in thickness between the outermost portion and the center portion of the baked layer is larger than a difference in thickness between the outermost portion and the center portion of the first metallic layer.

The difference in thickness will be described while taking the case where the second electrode layer 62 is only a baked layer in FIG. 4 as an example. The thickness of the baked layer 62 on the outermost internal electrode layer 35a is a thickness indicated by the double-headed arrow $Y_2$ in FIG. 4, and the thickness of the baked layer 62 on the outermost internal electrode layer 35b is a thickness indicated by the double-headed arrow $Y_3$ in FIG. 4. The thicknesses respectively indicated by the double-headed arrow $Y_2$ and the double-headed arrow $Y_3$ are the thicknesses of the outermost portions of the baked layer.

The thickness of the baked layer 62 in the center in the lamination direction is the thickness indicated by the double-headed arrow $Y_1$ in FIG. 4. The thickness indicated by the double-headed arrow $Y_1$ is the thickness of the center portion of the baked layer. The center in the lamination direction can be defined as the middle point of the two outermost internal electrode layers.

Since the thickness of the center portion of the baked layer is usually larger than the thickness of the outermost portion of the baked layer, a difference in thickness between the outermost portion and the center portion of the baked layer can be calculated by subtracting a mean value of thicknesses of the two outermost portions of the baked layer from the thickness of the center portion of the baked layer.

The difference in thickness between the outermost portion and the center portion of the baked layer determined in this manner is larger than the difference between the thickness of the outermost portion of the first metallic layer and the thickness of the center portion of the first metallic layer.

The second metallic layer may include one or more than one resin layers. When the second metallic layer includes a resin layer, it is preferred that the resin layer is disposed on the baked layer.

The resin layer may include conductive grains and a thermosetting resin. When the resin layer includes conductive grains, the resin layer may be provided without forming a baked layer, however, in order to make the specific resistance of the second metallic layer lower than the specific resistance of the first metallic layer, the mixing amount or the like of the conductive grains is adjusted.

Preferably, the thickness of the thickest portion of the resin layer is about 5 μm or more and about 100 μm or less, for example. When the resin layer includes a plurality of layers, the thickness of the resin layer is defined as a total thickness of the plurality of layers.

As the metal defining the second metallic layer, preferably at least one metal selected from the group consisting of Cu, Ni, Ag, Pd, Ag—Pd alloy and Au is contained, and more preferably Cu is contained. Grains of the metal described above may be used as the conductive grains contained in the resin layer.

Further, as the glass defining the baked layer as the second metallic layer, $BaO$—$SrO$—$B_2O_3$—$SiO_2$ glass, $Bi_2O_3$—$B_2O_3$—$SiO_2$—$ZnO$—$Al_2O_3$ glass, $ZnO$—$B_2O_3$—$SiO_2$—$Al_2O_3$ glass or the like can preferably be used.

Preferably, the plating layer is a layer containing at least one metal selected from the group consisting of Cu, Ni, Ag, Pd, Ag—Pd alloy and Au.

Preferably, the plating layer is a layer not containing glass.

Preferably, the plating layer includes about 99% by volume or more of metal per its unit volume, for example.

The plating layer may include a single layer or a plurality of layers. Preferably, the plating layer is a Ni plating layer disposed on the second metallic layer, and a Sn plating layer disposed thereon.

When the Ni plating layer is provided, it is possible to prevent the second metallic layer from being eroded by a solder at the time of mounting the electronic component, whereas when the Sn plating layer is provided, the wettability of the solder at the time of mounting the electronic component is improved, and mounting of the electronic component is facilitated.

Preferably, the thickness per one plating layer is about 1 μm or more, for example.

Preferably, the plating layer is formed by plating a film of the metal defining the plating layer along the thickness direction.

Also, an electronic component according to a preferred embodiment of the present invention may further be provided with an external electrode on a lateral surface of the laminate.

Hereinafter, one example of another preferred embodiment of the electronic component of the present invention will be described.

Figure 5:
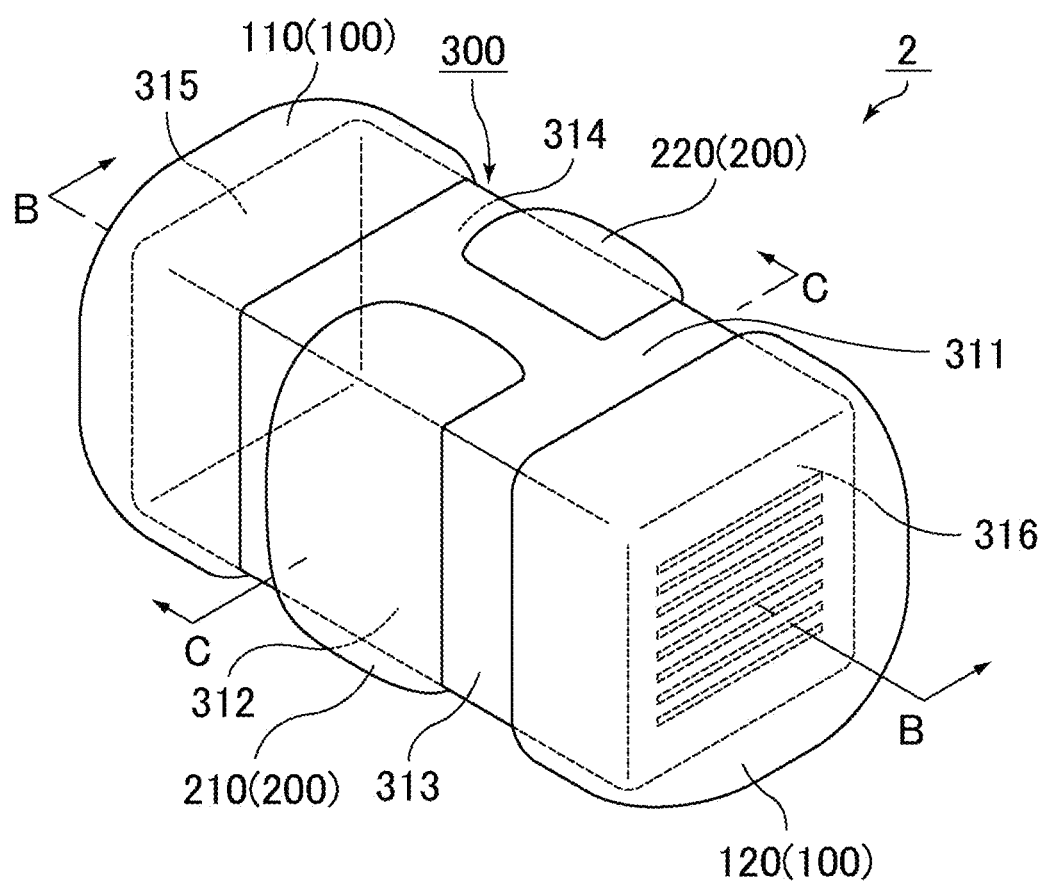
FIG. 5 is a perspective view schematically showing another example of a multilayer ceramic capacitor which is an electronic component according to a preferred embodiment of the present invention.

FIG. 5 is a perspective view schematically showing another example of a multilayer ceramic capacitor which is an electronic component according to a preferred embodiment of the present invention.

A multilayer ceramic capacitor 2 shown in FIG. 5 includes a laminate 300 in which the configuration of the internal electrode layer is different from that of the laminate shown in FIG. 1, the external electrode 100 disposed on an end surface of the laminate 300, and an external electrode 200 disposed on a lateral surface of the laminate 300.

The positional relationship between the external electrode 100 and the laminate 300 is preferably identical to that of the multilayer ceramic capacitor 1 shown in FIG. 2.

The external electrode 200 preferably includes a third external electrode 210 and a fourth external electrode 220. The third external electrode 210 is disposed on a first lateral surface 313 of the laminate 300, and extends from the first lateral surface 313 to respective portions of a first principal surface 311 and a second principal surface 312.

The fourth external electrode 220 is disposed on a second lateral surface 314 of the laminate 300, and extends from the second lateral surface 314 to respective portions of the first principal surface 311 and the second principal surface 312.

Figure 6A:
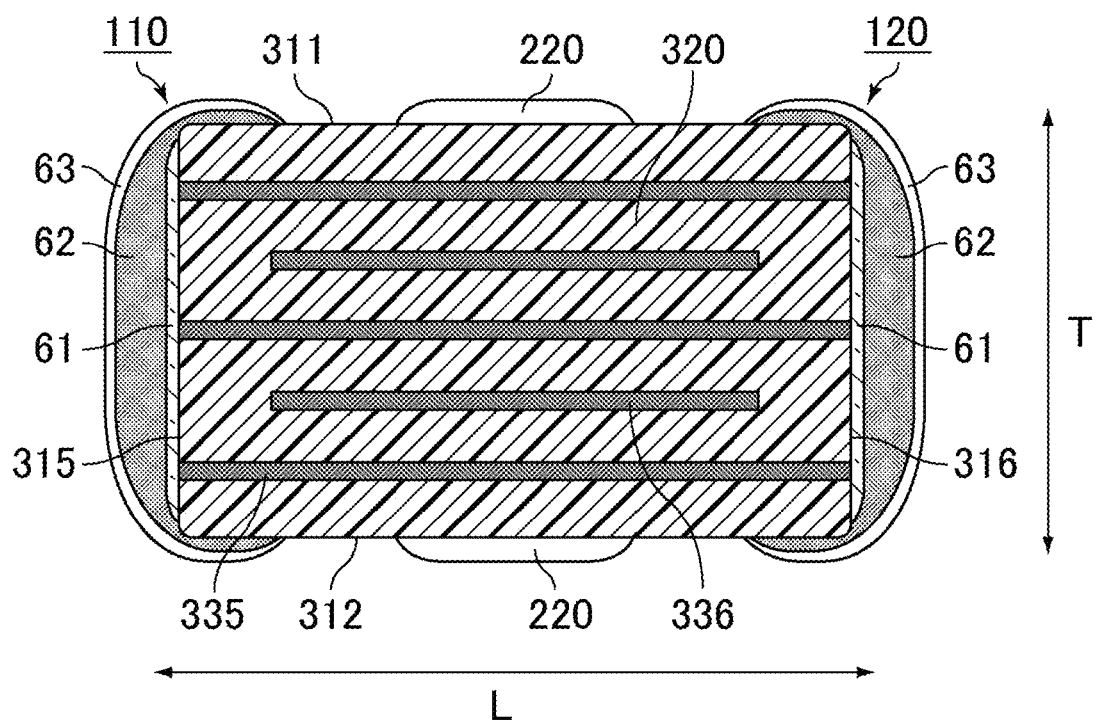
FIG. 6A is a sectional view schematically showing one example of an LT section of the multilayer ceramic capacitor shown in FIG. 5.
Figure 6B:
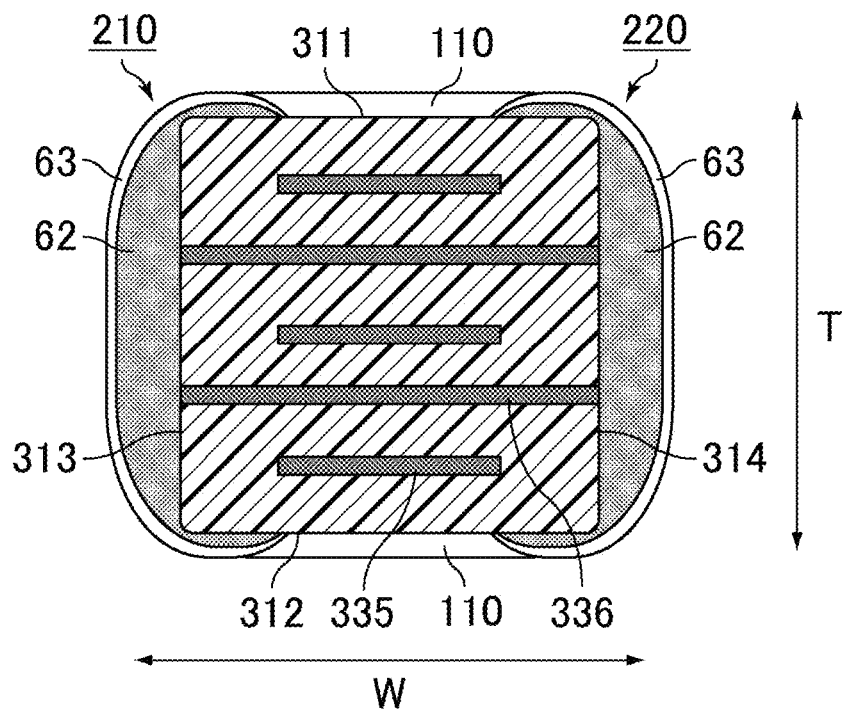
FIG. 6B is a sectional view schematically showing one example of a WT section of the multilayer ceramic capacitor shown in FIG. 5.
Figure 7A:
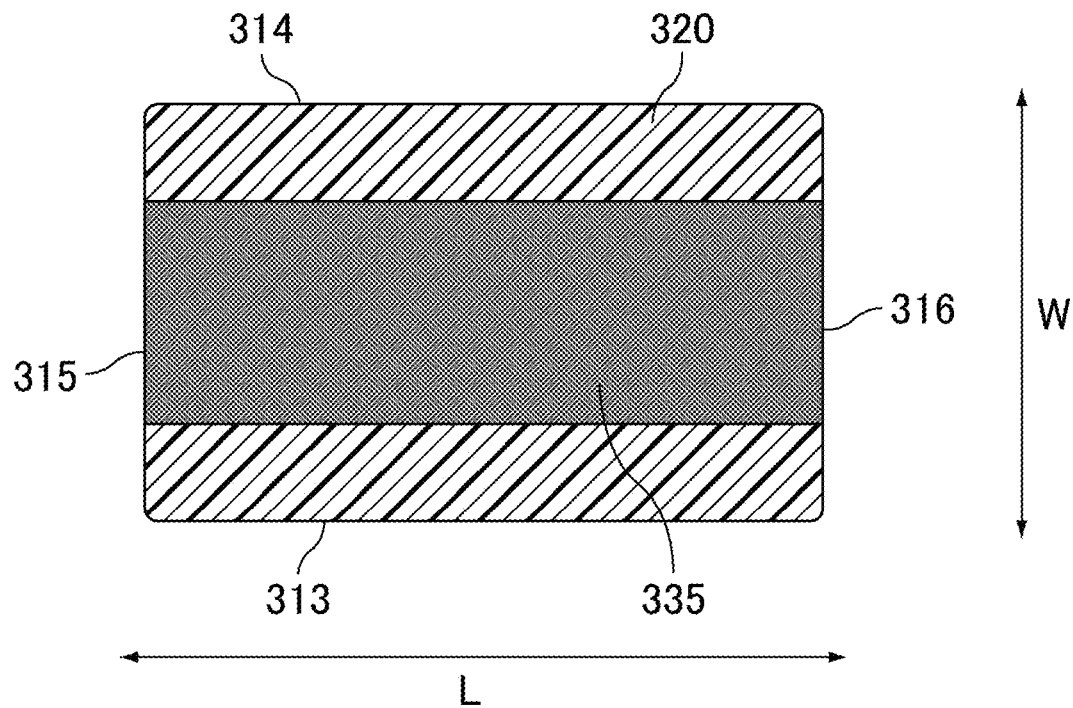
FIG. 7A is a plan view showing one example of a shape of an internal electrode layer according to a preferred embodiment of the present invention extended on both end surfaces.
Figure 7B:
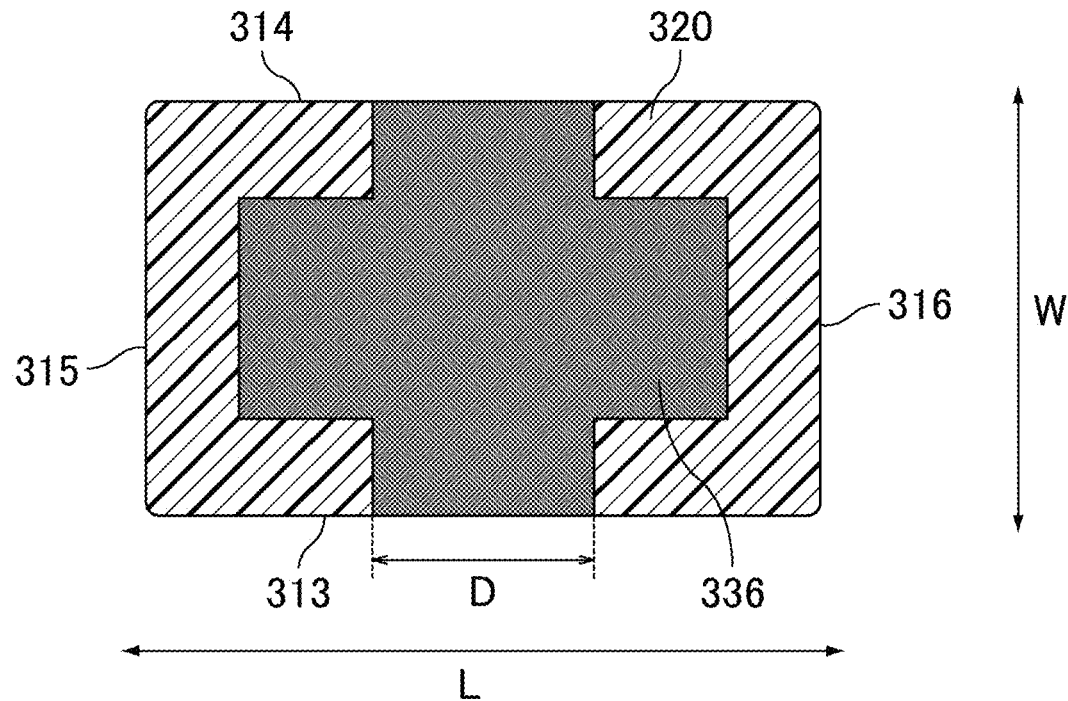
FIG. 7B is a plan view showing one example of a shape of an internal electrode layer according to a preferred embodiment of the present invention extended on both lateral surfaces.

FIG. 6A is a section view schematically showing one example of an LT section of the multilayer ceramic capacitor shown in FIG. 5. FIG. 6A is also a section view along the line B-B in FIG. 5. FIG. 6B is a section view schematically showing one example of a WT section of the multilayer ceramic capacitor shown in FIG. 5. FIG. 6B is also a section view along the line C-C in FIG. 5. FIG. 7A is a section view showing one example of a shape of an internal electrode layer extended on both end surfaces, and FIG. 7B is a section view showing one example of a shape of an internal electrode layer extended on both lateral surfaces. FIGS. 7A and 7B are LW section views.

The internal electrode layer preferably includes a first internal electrode layer 335 and a second internal electrode layer 336, which are opposed to each other with a dielectric layer 320 interposed therebetween.

The first internal electrode layer 335 is extended to a first end surface 315 and a second end surface 316, and the second internal electrode layer 336 is extended to the first lateral surface 313 and the second lateral surface 314. The second internal electrode layer 336 has a dimension D at each of the first and second lateral surfaces 313 and 314.

The first external electrode 110 is electrically connected with the first internal electrode layer 335 on the first end surface 315, and the second external electrode 120 is electrically connected with the first internal electrode layer 335 on the second end surface 316. The third external electrode 210 is electrically connected with the second internal electrode layer 336 on the first lateral surface 313, and the fourth external electrode 220 is electrically connected with the second internal electrode layer 336 on the second lateral surface 314.

The configuration of the first external electrode 110 disposed on the end surface of the laminate 300 is preferably identical to that in the case of the multilayer ceramic capacitor 1 shown in FIG. 2, and includes the first metallic layer 61 connected with the first internal electrode layer 335, the second metallic layer 62 disposed on the first metallic layer 61, and the plating layer 63 disposed on the second metallic layer 62.

The first metallic layer has a higher specific resistance than the second metallic layer, and a difference between the thickness of the outermost portion of the first metallic layer which is the thickness of the first metallic layer on the outermost internal electrode layer disposed on the outermost side in the lamination direction among the internal electrode layers, and the thickness of the center portion of the first metallic layer of the first metallic layer in the center in the lamination direction is about 5 μm, for example.

Also, preferred configurations of the first metallic layer, the second metallic layer and the plating layer are preferably identical to those in the case of the multilayer ceramic capacitor 1 shown in FIG. 2.

Also, the configuration of the second external electrode 120 is preferably identical to that of the first external electrode 110.

The third external electrode 210 and the fourth external electrode 220 disposed on the lateral surface of the laminate 300 do not need to include a first metallic layer, but include the second metallic layer 62 connected with the second internal electrode layer 336 and the plating layer 63 disposed on the second metallic layer 62.

A first metallic layer defining and functioning as a resistive layer may be provided as in the first external electrode and the second external electrode, and in this case, the variation in the thickness of the first metallic layer may be large or small.

The material of each layer defining the external electrode disposed on the lateral surface of the laminate can be identical to the material of each layer defining the external electrode disposed on the end surface of the laminate.

While electronic components of preferred embodiments of the present invention have been described while taking the case where the electronic component is a multilayer ceramic capacitor as an example, the electronic components of preferred embodiments of the present invention including a laminate and an external electrode is not limited to a multilayer ceramic capacitor.

In the case of an electronic component other than the multilayer ceramic capacitor, piezoelectric ceramics such as PZT ceramics, semiconductor ceramics such as spinel ceramics, or magnetic ceramics such as ferrite can be used as a ceramic that forms the dielectric layer.

When a piezoelectric ceramic is used, the component defines and functions as a piezoelectric component, when a semiconductor ceramic is used, the component defines and functions as a thermistor, and when a magnetic ceramic is used, the component defines and functions as an inductor. In the case of an inductor, the internal electrode layer is a coiled conductor.

Hereinafter, a non-limiting example of a method for manufacturing an electronic component of the present invention will be described while taking the case of manufacturing a multilayer ceramic capacitor as an example.

A laminate can be prepared in the following manner.

By applying a ceramic slurry prepared by mixing a ceramic and an organic substance which are materials for a dielectric layer, and a solvent or the like, on a carrier film such as a PET film or the like in the form of a sheet by a method such as spray coating, die coating, or screen printing, a dielectric sheet is obtained. The thickness of the dielectric sheet is preferably about 0.6 μm or more and about 1.2 μm or less.

A conductive paste that forms an internal electrode layer, made of a metallic material such as Ni powder, a solvent, a disperser, a binder and the like is prepared. The conductive paste that forms an internal electrode layer is applied on the dielectric sheet by screen printing, gravure printing or the like method to form an internal electrode pattern.

The thickness of the printed internal electrode pattern is preferably about 0.6 μm or more and about 2.0 μm or less.

A predetermined number of dielectric sheets of an inner layer portion on which an internal electrode pattern is formed, and dielectric sheets for an outer layer portion on which an internal electrode pattern is not formed are laminated to obtain a multilayer sheet.

The multilayer sheet is pressure-bonded by rigid body pressing or isostatic pressing to obtain a multilayer block. The dielectric sheets can be bonded with each other by conducting the pressure bonding at a predetermined temperature. By disposing a resin sheet having a certain thickness as the outermost layer, a pressure is applied to the portion where the internal electrode pattern is not formed, and the bonding power between the dielectric sheets is able to be improved.

The multilayer block is separated into individual pieces by dicing, press-cutting or the like method. Thus, a chip in which the internal electrode layer is exposed on the end surface is obtained.

By firing the chip under a predetermined condition, a laminate is obtained.

Subsequently, it is preferred to conduct barrel polishing by putting the laminate and an abrasive in a barrel, and giving rotary motion on the barrel to round the corner portions of the laminate.

A conductive sheet that is to define a first metallic layer is added on the first end surface of the laminate.

First, a conductive sheet is prepared. The conductive sheet is a sheet containing materials that are to become a first metallic layer, and is a sheet obtained from a conductive slurry containing required substances selected from a resin, a solvent, a disperser, metal powder, glass, an oxide powder and the like, for example.

By applying the conductive slurry in a form of a sheet on a carrier film such as a PET film by spray coating, die coating, screen printing or the like method, and drying it, a conductive sheet is obtained on the carrier film.

Preferably, the applying thickness of the conductive slurry is about 3 μm or more and about 45 μm or less.

A preferred mixing example of the conductive slurry is as follows.

Ni powder: about 1% by weight or more and about 40% by weight or less

Indium tin oxide powder: about 10% by weight or more and about 50% by weight or less Glass: about 15% by weight or more and about 30% by weight or less Resin: about 20% by weight or more and about 40% by weight or less Solvent: about 20% by weight or more and about 50% by weight or less Disperser: about 1% by weight or more and about 10% by weight or less It is also preferred to use Cu powder or Ag powder in place of Ni powder.

FIGS. 8A and 8B, and FIGS. 9A to 9C are process charts schematically showing the step of adding a conductive sheet on the first end surface of the laminate.

Hereinafter, a method for adding a conductive sheet on the first end surface of the laminate will be described by referring to attached drawings.

Figure 8A:
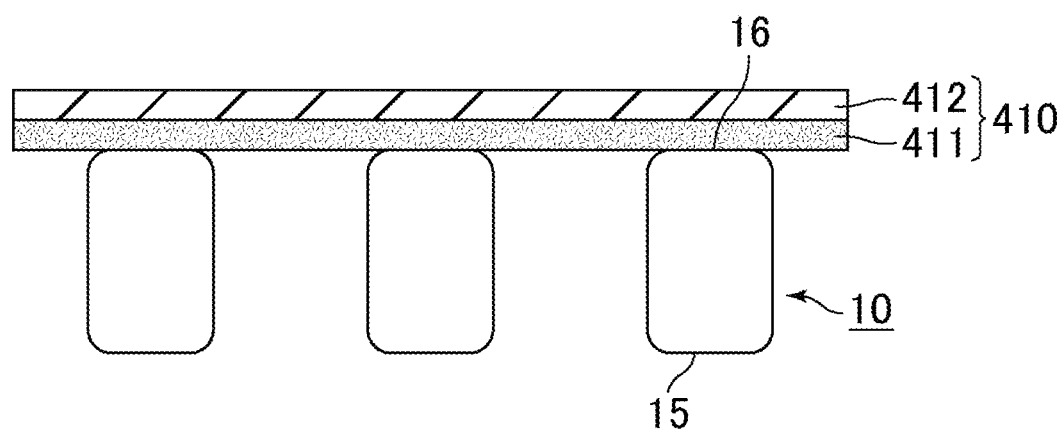
FIGS. 8A and 8B are process charts schematically showing the step of adding a conductive sheet on a first end surface of a laminate according to a preferred embodiment of the present invention.

As shown in FIG. 8A, a pressure sensitive adhesive sheet 410 in which a pressure sensitive adhesive layer 411 is formed on a base material 412 is prepared, and the second end surface 16 of the laminate 10 is carried on the pressure sensitive adhesive layer 411 by pressure sensitive adhesion.

As the pressure sensitive adhesive sheet 410, a sheet for which the adhesive strength can be adjusted, such as a foamed release sheet, is preferably used.

Figure 8B:
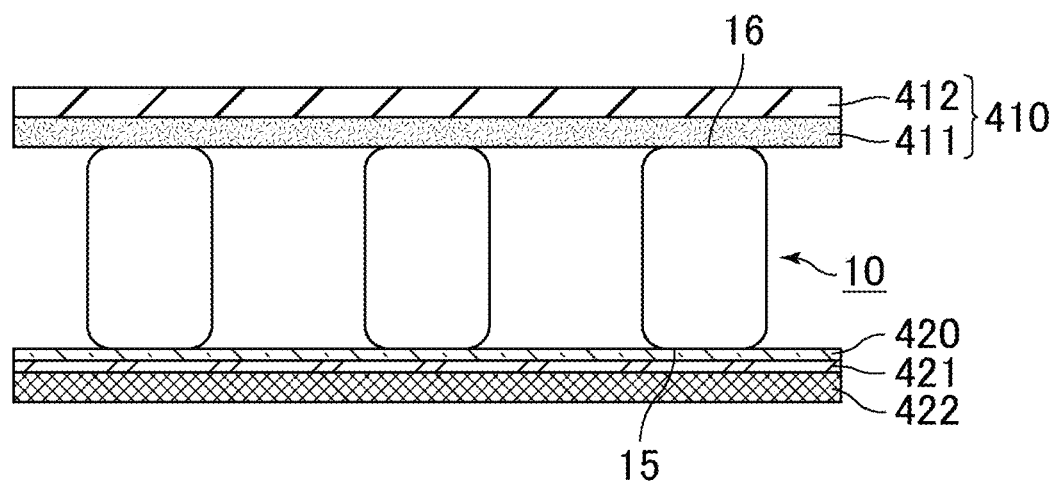

As shown in FIG. 8B, a conductive sheet 420 carried on a carrier film 421 is prepared, and placed on a heating plate 422.

Then the first end surface 15 of the laminate 10 is brought into abutment with the conductive sheet 420. In the condition that the conductive sheet 420 and the first end surface 15 of the laminate 10 are in abutment with each other, heating is conducted by using the heating plate 422.

The temperature of heating is preferably a temperature that is equal to or higher than the phase transition point of the resin contained in the conductive sheet. By heating to a temperature higher than the phase transition point of the resin while the conductive sheet and the laminate are in abutment with each other, the conductive sheet is more likely to adhere with the laminate.

The conductive sheet may be brought into abutment with the end surface of the laminate while it is separated from the carrier film. In the condition of being separated from the carrier film, a punching step as will be described later is able to be conducted more easily. On the other hand, carrying by the carrier film is advantageous when a thin conductive sheet is used. Also, a plurality of conductive sheets may be used.

Heating by the heating plate is not necessary, and when heating is not conducted, it is preferred to apply a solvent on the first end surface of the laminate before bringing the laminate into abutment with the conductive sheet.

Subsequently, heat radiation is conducted in the condition that the conductive sheet and the first end surface of the laminate are in abutment with each other. Heat radiation can be conducted by using an air-cooling fan, a Peltier element or the like, for example. Also natural heat radiation can be used.

By heat radiation, the later-described punching step becomes easy to conduct.

Figure 9A:
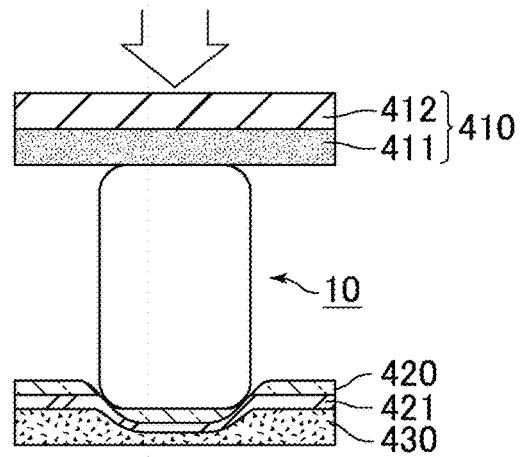
FIGS. 9A, 9B, and 9C are process charts schematically showing the step of adding a conductive sheet on a first end surface of a laminate according to a preferred embodiment of the present invention.

Then as shown in FIG. 9A, an elastic body 430 is disposed in place of the heating plate 422, and the laminate 10 is pressurized from the side of the pressure sensitive adhesive sheet 410 to conduct punching of the conductive sheet 420. The punched out conductive sheet 420 is added on the first end surface 15 of the laminate 10.

The elastic body used herein preferably has a temperature of about 25° C. or less, for example. This is because if the conductive sheet deforms due to the resin contained in the conductive sheet, it is difficult to punch at corner portions of the laminate. Also the modulus of elasticity of the elastic body is preferably about 50 MPa or less, and the thickness of the elastic body is preferably about 5 mm or less, for example.

Figure 9B:
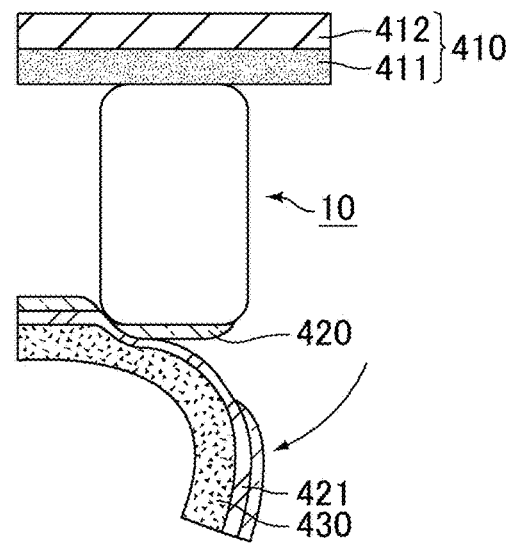

Next, as shown in FIG. 9B, the carrier film 421 and the elastic body 430 which are the sheets other than the conductive sheet 420 are peeled off. While the peeling method is not limited, a method of peeling in the manner as illustrated in FIG. 9B is preferred because the added conductive sheet is less likely to be released from the first end surface of the laminate.

The carrier film and the elastic body may be peeled off after the later-described thermal pressure bonding.

Figure 9C:
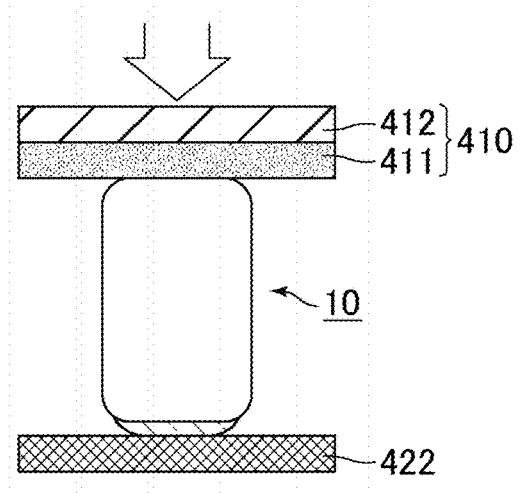

Then as shown in FIG. 9C, the conductive sheet 420 is brought into contact with the heating plate 422, and the laminate 10 is pressurized from the side of the pressure sensitive adhesive sheet 410, and thus the laminate 10 and the conductive sheet 420 are thermal pressure-bonded. By the thermal pressure bonding, the conductive sheet is added on the first end surface of the laminate firmly.

Preferably, the heating temperature is about 200° C. or less. Also preferably, the heating temperature is a temperature less than or equal to the phase transition point where the conductive sheet softens.

This step is not necessary if the conductive sheet is sufficiently stuck to the laminate when the conductive sheet is punched out.

By the above step, it is possible to add the conductive sheet to the first end surface of the laminate.

The conductive sheet added on the first end surface of the laminate defines a first electrode layer.

Also a conductive sheet may be added on the second end surface of the laminate as necessary in the same manner as described above. In this case, the same step is conducted while the conductive sheet added on the first end surface of the laminate is brought into abutment with the pressure sensitive adhesive sheet.

In the above step, as the conductive sheet, those having a breaking strength of about 1 MPa or more and about 50 MPa or less are preferably used, and those having a breaking strain of about 50% or less are preferably used, for example.

At the time of punching of the conductive sheet, the corner portions of the laminate are rounded because a barrel-finished laminate is used. Non-uniform roundness of the corner portions of the laminate leads instable punching of the conductive sheet. For stabilization, it is preferred to adjust pressure or temperature at the time of punching, adjust a pressure, temperature or time at the time of heating before punching, or change the kind of the resin used in preparation of the conductive sheet.

Next, the first end surface of the laminate on which the conductive sheet is added is dipped in the conductive paste that is to form a second metallic layer.

Figure 10A:
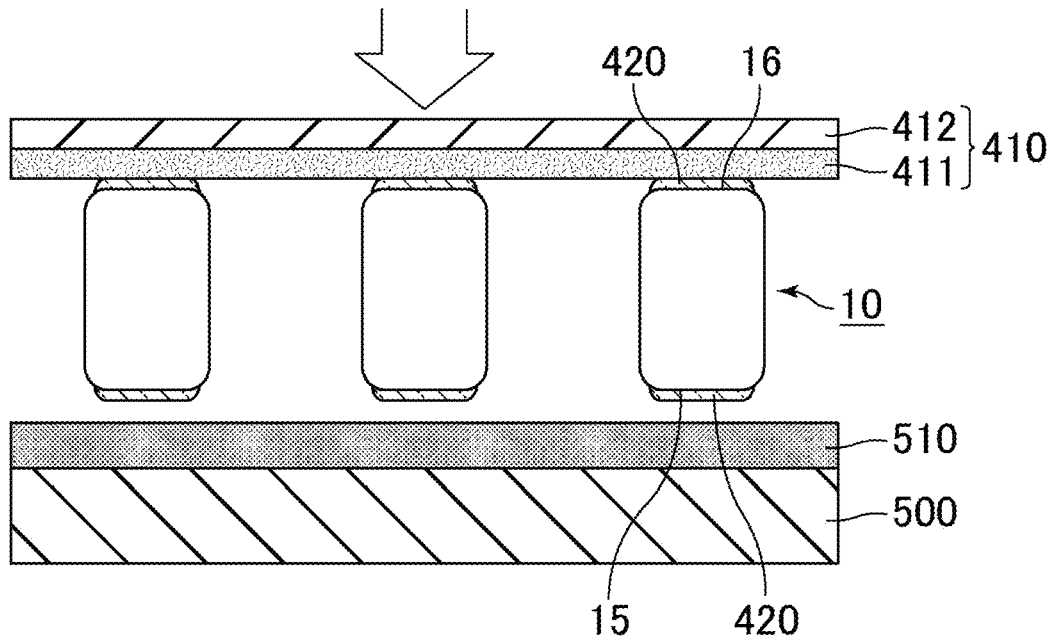
FIGS. 10A and 10B are process charts schematically showing a step of dipping in a conductive paste according to a preferred embodiment of the present invention.
Figure 10B:
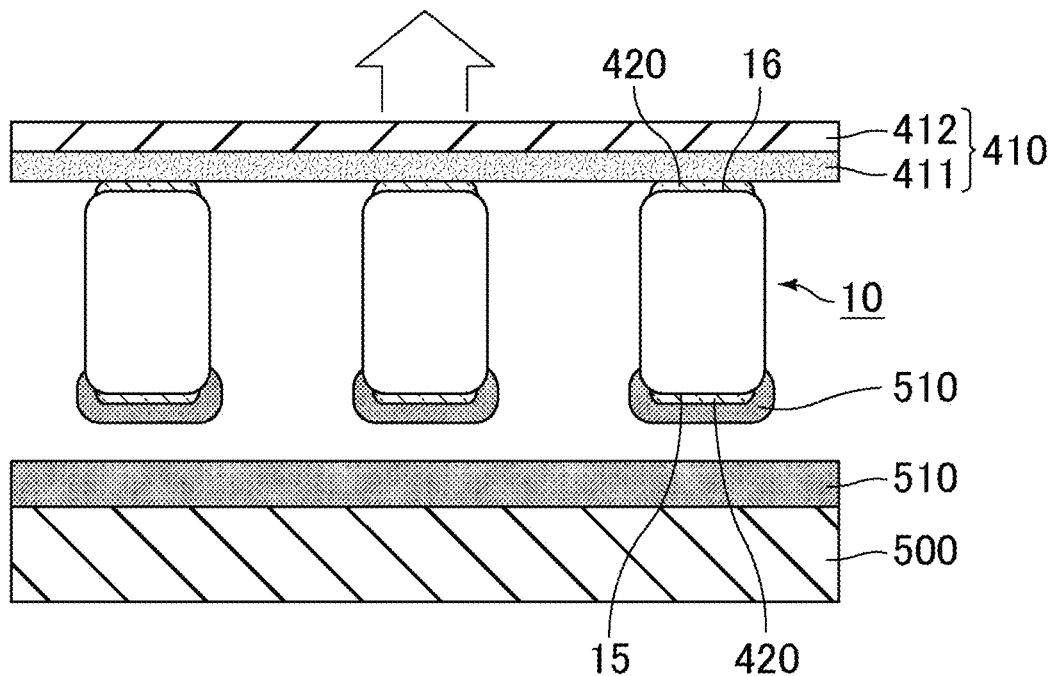

FIGS. 10A and 10B are process charts schematically showing a step of dipping in a conductive paste.

On a base 500, a conductive paste 510 that is to form a second metallic layer is preferably formed in a layered form of a certain thickness.

The conductive paste 510 is a paste containing materials for a second metallic layer, and contains metal powder, glass, a disperser, a solvent and the like that constitute the second metallic layer, and preferably has a certain viscosity. The first end surface 15 of the laminate 10 on which the conductive sheet 420 is added is dipped in the conductive paste 510, and pulled up, and thus the conductive paste that is to form a second metallic layer is added.

For preventing the conductive paste from being excessively applied, it is preferred to subject the surface of the laminate to an oil repellent treatment in advance.

After pulling up the laminate, it is preferred to conduct drying.

After drying, the laminate may be dipped in other conductive paste, and the conductive paste may be added plural times.

It is also possible to improve the flatness of the end surface and promote the reduction in thickness by pushing the laminate against a flat plate after addition of the conductive paste.

Subsequently, a conductive paste is added also to the second end surface in the same manner.

After adding the conductive paste on both end surfaces, the laminate is heated at a temperature of about 600° C. or more and about 800° C. or less, for example, and thus the second metallic layer as a baked layer is able to be achieved.

As a heating method, various heating methods including the method by means of a heater, the method using far-infrared rays and so on can be used. When the second metallic layer that is not a baked layer is formed, heating is not necessary.

On the second metallic layer, a plating layer is formed by a plating treatment. Preferably, the plating layer is formed in the order of Ni plating, and Sn plating. As the plating method, various methods such as electrolytic plating can be used.

Through these steps, a multilayer ceramic capacitor as an electronic component according to a preferred embodiment of the present invention is able to be manufactured.

For manufacturing the multilayer ceramic capacitor of the form shown in FIG. 5, the laminate is prepared with a different internal electrode pattern, and an external electrode is formed by adding a conductive paste on the lateral surface of the laminate.

Examples of electronic components of the present invention more specifically are shown hereinafter. It is to be noted that the present invention is not limited exclusively to these Examples of preferred embodiments discussed below.

Example 1

To $BaTiO_3$ as a ceramic material for preparing a multilayer ceramic capacitor, a polyvinyl butyral binder, a plasticizer and an ethanol as an organic solvent were added, and these were wet-mixed by a ball mill, to prepare a ceramic slurry. Then this ceramic slurry was formed into a sheet by a ripping method, to obtain a rectangular or substantially rectangular ceramic green sheet. Then on the ceramic green sheet, a conductive paste containing Ni was applied by screen printing, to form an internal electrode pattern containing Ni as a main component. Then a plurality of the ceramic green sheets on which the internal electrode pattern was formed were laminated so that the side where the internal electrode layer was extended was alternately arranged, to obtain a green multilayer sheet which was to form a capacitor body. Then the green multilayer sheet was pressure-molded, and divided by dicing to obtain a chip. The obtained chip was heated in an $N_2$ atmosphere to burn the binder, and then fired in a reducing atmosphere containing $H_2$, $N_2$ and $H_2O$ gas, to obtain a sintered laminate. The obtained laminate has a structure including a plurality of dielectric layers and a plurality of internal electrode layers.

For this laminate, barrel polishing was conducted to round the corner portions of the laminate.

Example 2

A slurry having the following composition was prepared as a conductive slurry for adding a conductive sheet.

Ni powder: 1% by weight or more and 40% by weight or less
Indium tin oxide powder: 10% by weight or more and 50% by weight or less
Glass: 15% by weight or more and 30% by weight or less
Resin: 20% by weight or more and 40% by weight or less
Solvent: 20% by weight or more and 50% by weight or less
Disperser: 1% by weight or more and 10% by weight or less The conductive slurry having the above composition was applied on a carrier film, and conductive sheets having four different thicknesses of the Examples 1 to 4 were prepared, and each of the conductive sheets was heated while it was brought into abutment with the end surface of the laminate, and the conductive sheet was punched out after heat radiation.

After peeling off the carrier film, the conductive sheet added on the end surface of the laminate was pressurized while it was brought into contact with the heating plate, and thus the conductive sheet was stuck on the end surface of the laminate.

The conductive sheet was added on both of the first end surface and the second end surface of the laminate.

Example 3

As a conductive paste that is to form a second electrode layer, a conductive paste containing a glass frit and Cu powder was prepared.

The end surface of the laminate on which the conductive sheet was added was dipped in the conductive paste which was to form a second metallic layer, and pulled up, and then firing was conducted to form a second electrode layer.

On the second electrode layer, a Ni plating layer and a Sn plating layer were provided by a plating treatment, and thus a multilayer ceramic capacitor was manufactured.

Comparative Example

A conductive paste was prepared in place of the conductive slurry of Example 1, and the end surface of the laminate was dipped in the conductive paste and dried, and thus a first metallic layer connected with the internal electrode layer was formed.

Then dipping into the conductive paste which was to form a second electrode layer, and a plating treatment were conducted in the same manner as in each Example, and a multilayer ceramic capacitor was manufactured.

Then for the multilayer ceramic capacitors manufactured in the Examples and Comparative Example, the following evaluation was conducted.

The multilayer ceramic capacitor was polished to the center portion in the width direction to include an external electrode, and polishing drips on the polished surface were removed.

A virtual line was drawn from the thickest portion of the external electrode toward the laminate, and the first metallic layer including the virtual line was imaged by SEM so that the area of the image was 150 μm×150 μm (1 k times). Since the image cannot be taken in one view, a plurality of views set to include the entire internal electrode depending on the size were taken. The images were taken so that they were partly overlapped with each other. From the taken images, the thickness of the first metallic layer on the outermost internal electrode layer, and the thickness of the first metallic layer in the center in the lamination direction were measured, and a difference between the thickness of the outermost portion of the first metallic layer, and the thickness of the center portion of the first metallic layer was determined.

Figure 11:
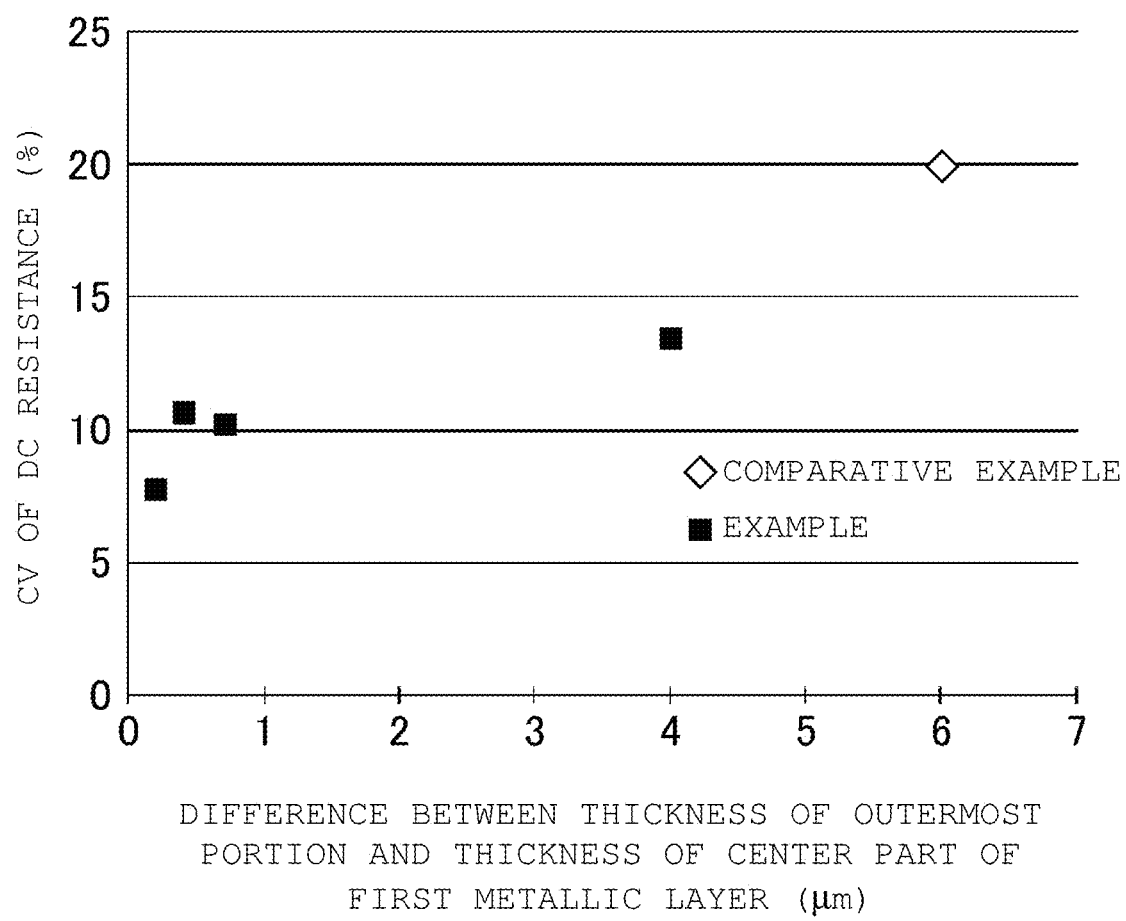
FIG. 11 is a plot showing the relation between a difference between the thickness of the outermost portion and the thickness of the center portion of the first metal layer, and a CV value of the DC resistance, in each of the Examples of preferred embodiments of the present invention and a Comparative Example.

For each Example and Comparative Example, measurement was conducted for fifty multilayer ceramic capacitors, and a mean value of the difference was determined, and plotted on the horizontal axis of FIG. 11.

For each of the multilayer ceramic capacitors manufactured in Example and Comparative Example, ESR measured at 1 MHz by a LCR meter (for example, a E4980 meter, available from Agilent Technologies) was acquired, and a CV value of the same was calculated. For each of the Examples and Comparative Example, measurement was conducted for fifty multilayer ceramic capacitors, and a mean value of the CV value was determined and plotted on the vertical axis of FIG. 11.

FIG. 11 is a plot showing the relation between a difference between the thickness of the outermost portion and the thickness of the center portion of the first metal layer, and a CV value of the DC resistance, in each of the Examples and Comparative Example.

As can be seen from this chart, when the difference between the thickness of the outermost portion and the thickness of the center portion of the first metallic layer is about 5 µm or less, for example, an electronic component with little variation in the resistance is able to be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminate including a plurality of dielectric layers and a plurality of internal electrode layers disposed in a lamination direction, the laminate including a first principal surface and a second principal surface opposite to each other in the lamination direction, a first lateral surface and a second lateral surface opposite to each other in a width direction perpendicular or substantially perpendicular to the lamination direction, and a first end surface and a second end surface opposite to each other in a length direction perpendicular or substantially perpendicular to the lamination direction and the width direction;
   a first external electrode disposed on the first end surface of the laminate, and connected with a first of the internal electrode layers; and
   a second external electrode disposed on the second end surface of the laminate, and connected with a second of the internal electrode layers; wherein
   the first external electrode includes a first metallic layer that includes glass and is connected with the first of the internal electrode layers, and a second metallic layer that is a baked layer and is disposed on the first metallic layer;
   the first metallic layer has a higher specific resistance than the second metallic layer;
   a difference between a thickness of an outermost portion of the first metallic layer which is a thickness of the first metallic layer on an outermost internal electrode layer disposed on an outermost side in the lamination direction among the internal electrode layers, and a thickness of a center portion of the first metallic layer which is a thickness of the first metallic layer in a center in the lamination direction being about 5 µm or less; and
   a difference between a thickness of an outermost portion of the second metallic layer which is a thickness of the second metallic layer on the outermost internal electrode layer disposed on the outermost side in the lamination direction among the internal electrode layers, and a thickness of a center portion of the second metallic layer which is a thickness of the second metallic layer in the center in the lamination direction is larger than the difference between the thickness of the outermost portion of the first metallic layer on the outermost internal electrode layer and the thickness of the center portion of the first metallic layer.

2. The electronic component according to claim 1, wherein the first metallic layer includes at least one compound selected from a group consisting of metal, a metal oxide, and glass.

3. The electronic component according to claim 2, wherein the metal comprises at least one metal selected from a group consisting of Ag, Ni, Cu, Au and Pd.

4. The electronic component according to claim 2, wherein the metal oxide includes at least one compound selected from a group consisting of indium tin oxide, alumina and zirconia.

5. The electronic component according to claim 1, wherein the metal defining the second metallic layer is Cu.

6. The electronic component according to claim 1, further comprising a plating layer provided in direct contact with the second metallic layer.

7. The electronic component according to claim 6, wherein the plating layer encapsulates both of the first metallic layer and second metallic layer while contacting each of the first principal surface, the second principal surface, the first lateral surface, and the second lateral surface.

8. The electronic component according to claim 6, wherein
   the first metallic layer contacts only one of the first end surface and the second end surface; and
   the second metallic layer contacts one of the first end surface and the second end surface while also contacting each of the first principal surface, the second principal surface, the first lateral surface, and the second lateral surface.

9. The electronic component according to claim 1, further comprising:
   a third external electrode disposed on one of the first lateral surface and the second lateral surface; and
   a fourth external electrode disposed on another one of the first lateral surface and the second lateral surface.

10. The electronic component according to claim 9, wherein
    some of the internal electrode layers are electrically connected between the first external electrode and the second external electrode; and
    other ones of the internal electrode layers are electrically connected between the third external electrode and the fourth external electrode.

11. The electronic component according to claim 10, wherein the some of the internal electrode layers extend in the length direction; and the other ones of the internal electrode layers include projection portions extending in both the length direction and the width direction.

* * * * *